Feb. 18, 1964   P. SCHNEIDER ETAL   3,121,535
WATERING DEVICE
Filed July 27, 1962                2 Sheets-Sheet 1
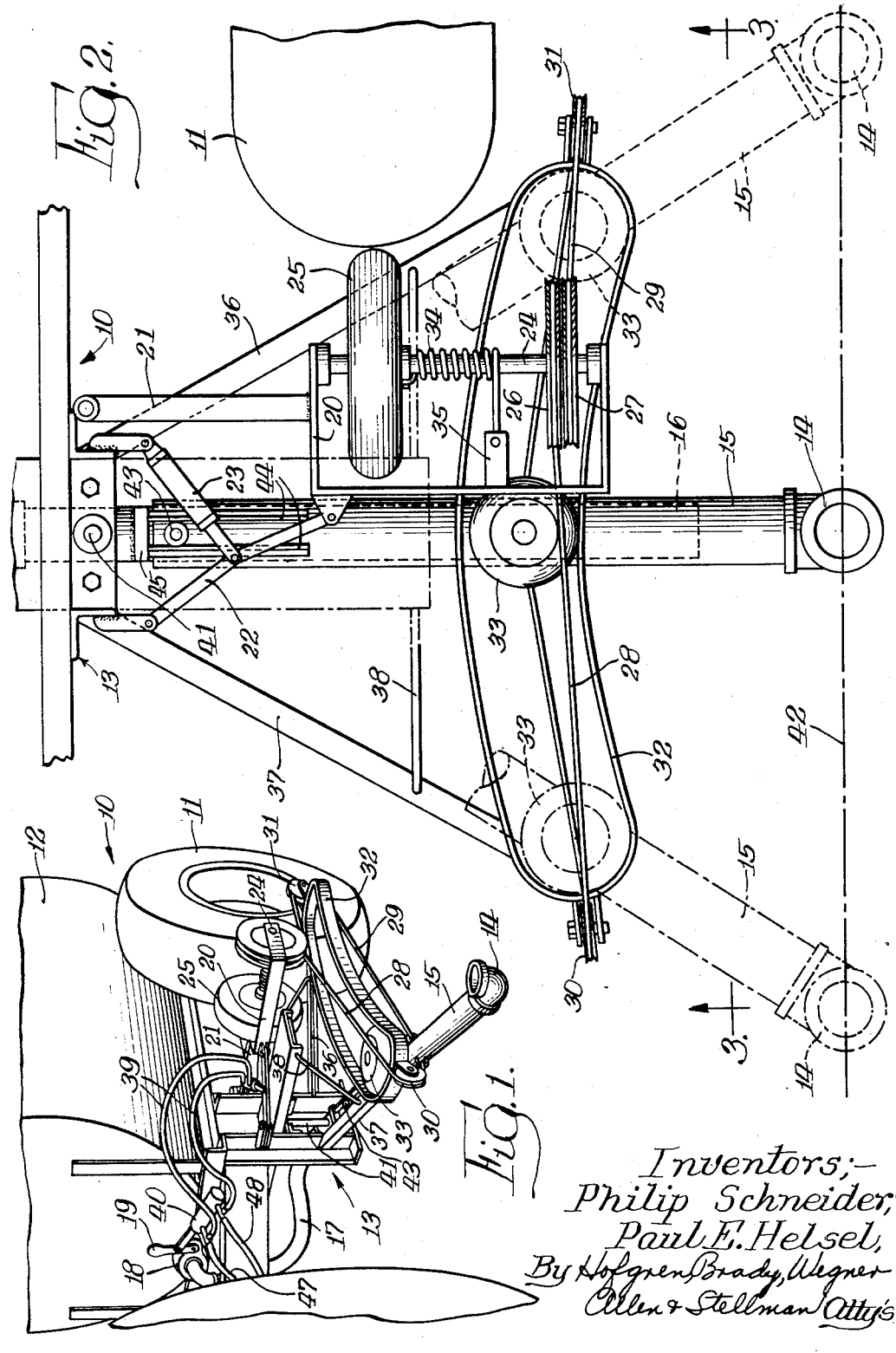
Inventors;–
Philip Schneider,
Paul E. Helsel,
By Hofgren, Brady, Wegner
Allen & Stellman Att'ys

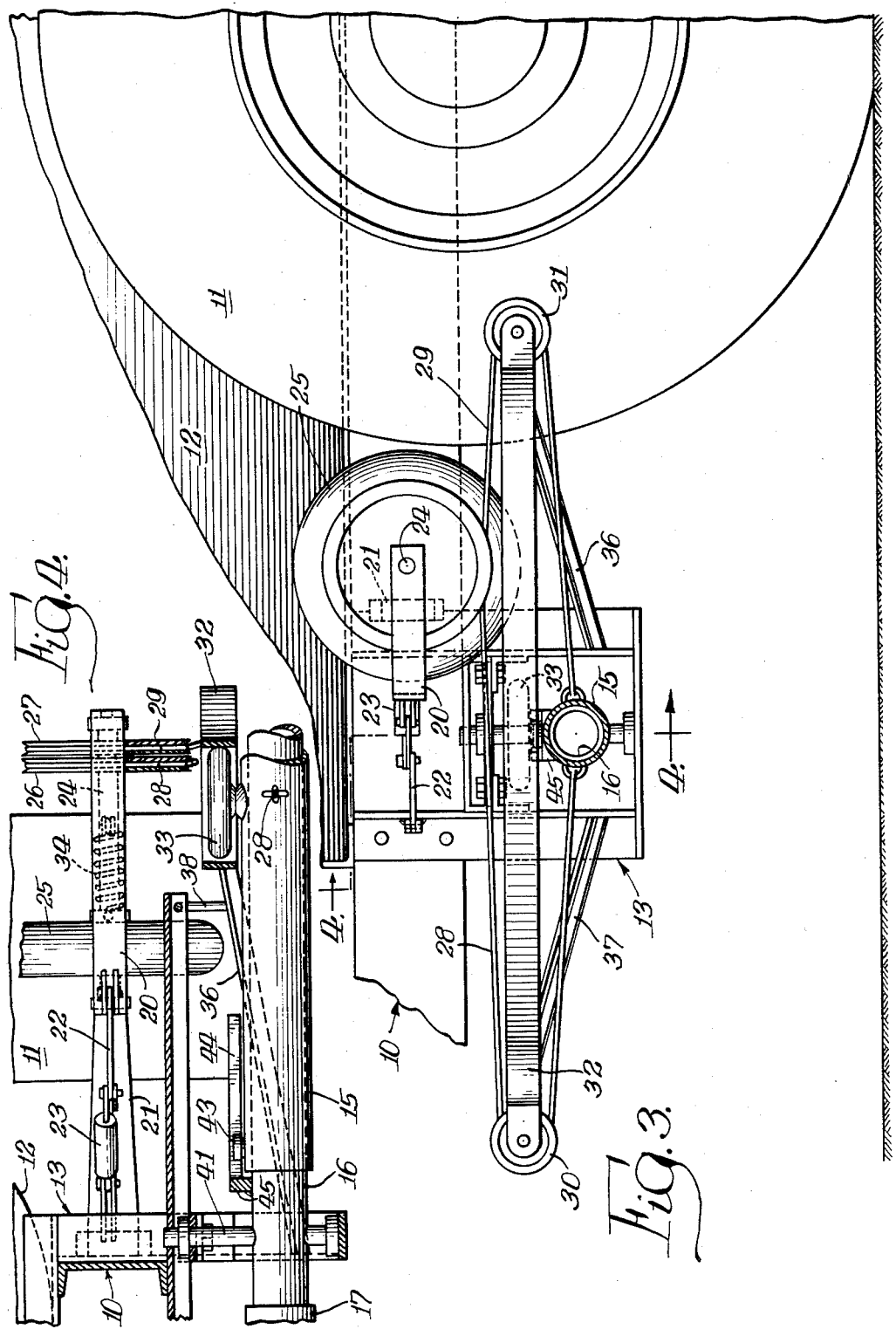

United States Patent Office 3,121,535
Patented Feb. 18, 1964

3,121,535
WATERING DEVICE
Philip Schneider, 1063 New Tampa Highway, Lakeland, Fla., and Paul E. Helsel, P.O. Box 177, Indiantown, Fla.
Filed July 27, 1962, Ser. No. 212,845
3 Claims. (Cl. 239—155)

This invention relates to a watering device and more particularly to an apparatus readily usable in conjunction with mobile equipment for applying water for agricultural purposes.

It is a general object of the present invention to produce a new and improved watering device of the character described.

It is a more specific object of the invention to produce a new and improved watering device which may be moved over the ground at a predetermined speed and yet provide for the sequential application of water to spaced apart flora, such as for example citrus trees and the like.

It is not uncommon to furnish water to growing trees and the like from a mobile water tank wagon in areas where other forms of irrigation are either not available or not feasible and where the normal rainfall is deficient. In the past, however, it has been necessary to stop the tank wagon at each tree or other area to be watered, apply the water and then move the wagon to the next tree or area where the process is repeated. This results in a waste of time and labor, with a resulting increased cost in the production of the crop.

According to the present invention, however, there is produced a tank wagon having a movable spout thereon together with means for moving the spout along a path paralleling the path of movement of the wagon but in a direction opposite to said direction and at a speed equal to the forward movement of the wagon so that the spout remains stationary over a predetermined area. After the proper quantity of water has been delivered, it may be shut off and the spout moved to a forward position where, when the water is again turned on, the spout will move in the direction previously described and thereby maintain its stationary position over another preselected area. By reason of the foregoing, it is possible to drive the tank wagon along a row of trees at a steady, uninterrupted pace and the spout will swing forwardly delivering water to the tree, and continue to deliver the water to the tree as the wagon moves past it. Thereafter, the spout will again swing forwardly to position itself by the next succeeding tree and the process will be repeated.

It is, therefore, another object of the present invention to produce a watering device of the type described in the preceding paragraphs which is so constructed and arranged as to deliver water to predetermined areas while remaining relatively motionless thereover, where the apparatus carrying the device may be continuously moved along a path paralleling the row of areas to be watered.

Other and further objects and advantages of the invention will be readily apparent from the following description and drawings, in which:

FIG. 1 is a side elevational view showing a water tank wagon including the apparatus of the present invention;

FIG. 2 is an enlarged top plan view of the apparatus shown in FIG. 1;

FIG. 3 is a vertical section taken along line 3—3 of FIG. 2; and

FIG. 4 is a vertical section taken along staggered line 4—4 of FIG. 3.

While this invention is susceptible of embodiment in many different forms, there is shown in the drawings and will herein be described in detail a specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, particularly FIGS. 1 and 2, there is shown a wagon 10 supported on the usual ground traversing wheels 11 and carrying a water tank 12. Mounted on the side of the wagon frame is a vertical frame 13 carrying means forming a water spout 14 which is located at the end of two telescoping pipe members 15 and 16, the inner one 16 of which is connected by means of a hose 17 to the tank 12. A valve 18, hydraulically operated by means hereinafter described, controls the admission of water from the tank into the hose 17.

A movable frame 20 is swingably carried on the end of a bar 21 pivoted to the frame and a pair of toggle links 22. A hydraulic piston and cylinder device 23 is connected between the frame and the juncture of the toggle 22 so that actuation thereof moves the frame 20 forwardly or rearwardly of the wagon frame as desired. The frame 20 rotatably carries a shaft 24 supporting drive wheel 25 movable into and out of engagement with one of the ground wheels 11 as the frame 20 is pivoted in the manner just described.

A pair of drive pulleys 26 and 27 are secured to and rotated by the shaft 24 and carry cables 28 and 29 passing over idler wheels 30 and 31, respectively, secured to the outer ends of an arcuate guide track 32 and extend beneath the guide track end to be secured to the side of the pipe member 13, as shown in FIG. 3. Riding in the guide track 32 is a follower wheel 33 secured to the pipe member 16. A torsion spring 34 is secured to the shaft 24 and to a bracket 35 mounted on the frame 20.

The foregoing apparatus is braced by a V-frame comprising legs 36 and 37 secured to the frame and tied together by tie rod 38. A pair of hydraulic lines is connected to either end of the cylinder 23.

A hydraulic piston and cylinder device 40 is connected to the valve handle 19, as illustrated in FIG. 1, for operating the valve. Hydraulic fluid under pressure for actuating the piston and cylinder devices 40 and 23 is supplied from a master cylinder (not shown) on the propulsion vehicle through hydraulic lines 47 and 48.

In operation the tank wagon 10 is propelled by a tractor (not shown) along a predetermined path paralleling, for example, a row of trees. The torsion spring 34 will normally swing the spout 14 to the forward position shown in FIG. 1 (and the left-hand dotted position shown in FIG. 2). When the spout is adjacent a tree to be watered, the operator, through a suitable control, effects operation of the master cylinder on the propulsion vehicle to direct hydraulic fluid under pressure to the piston and cylinder devices 23 and 40. The actuation of the cylinder 40 operates the handle 19 to allow water to flow into the hose 17 and hence into pipe members 15 and 16 and out the spout 14. The simultaneous introduction of hydraulic fluid under pressure into one end of the cylinder 23 moves the toggle 22 thereby to swing the frame 20 rearwardly to bring the drive wheel into frictional engaging contact with the ground wheel 11. Such contact serves to rotate the wheel 25 and thus the shaft 24. Rotation of the drive pulleys 26 and 27 will, through the arrangement described, pivot the pipe members 15 and 16 about their pivotal connection 41 to the frame so that the spout will travel along the line 42. To maintain the spout on the line, such pivotal movement of the pipe member causes the follower 33 to move along the arcuate track 32 and as it reaches the position shown in solid lines in FIG. 2, it will be noted that it has caused the outer pipe member 15 to telescope inwardly over the inward pipe member 16, a movement which is reversed as the pipe members are pivoted to the dotted line position shown on the right-hand side of FIG. 2. In its telescoping movement inwardly and outwardly the spout is maintained in up-right position by virtue of a guide wheel 43 travelling between guide channels 44 extending over the upper surface of the outer pipe member 15 and secured to a bracket 45 welded to the inner pipe member 16. This arrangement permits telescoping movement of the pipes but prevents rotation of the outer pipe 15 and hence of the spout 14.

After the wagon has passed the tree, the handle 19 is again actuated to shut off the flow of water to the pipe members and simultaneously direct fluid to the other end of the piston and cylinder device thereby moving the drive wheel 25 out of contact with the ground wheel. Upon disengagement of the ground wheel the torsion spring 34 will rotate the shaft 24 in the opposite direction, swinging the pipe members to their forward position relative to the frame ready for the application of water to the second tree in the row.

It will be noted that it is not necessary to halt the tank wagon in order to maintain the spout 14 stationary adjacent a tree or area to be watered but, on the contrary, the same may be moved at a steady pace down the row. Furthermore, the speed of the wagon may be varied without affecting the operation except for the amount of water applied inasmuch as such increase of speed is automatically reflected in increased speed of pivotal movement of the telescoping pipe members.

While the on and off operations of the valves 18 and 40 are shown as manually effected by the handle 19, automatic or power driven valve actuation may, of course, be substituted if desired.

We claim:

1. A watering device comprising: a ground traversing frame adapted to carry a pipe member which is adapted to be connected to a source of water, said pipe member having a discharge opening at one end, means mounting the pipe member on the frame for pivotal movement about a vertical axis and for movement inwardly and outwardly of the frame to vary the distance of the discharge opening from said axis, drive means for pivoting the pipe member from a forward to a rearward position relative to the frame, and simultaneously varying said distance, at a speed correlated with the ground traversing speed of the frame to cause said discharge opening to remain in fixed position over a predetermined area of the ground, means for disengaging the drive means and returning the pipe member to its forward position and means for re-engaging the drive means to maintain said discharge opening over another predetermined area.

2. A watering device comprising: a frame supported on ground traversing ground wheels and adapted to carry a pipe member which is adapted to be connected to a source of water, said pipe member having a discharge opening at one end, means mounting the pipe member on the frame for pivotal movement about a vertical axis and for movement inwardly and outwardly of the frame to vary the distance of the discharge opening from said axis, a drive wheel mounted on the frame and movable into and out of engagement with one of said ground wheels, said drive wheel when engaged serving to pivot the pipe member from a forward to a rearward position relative to the frame, and simultaneously to vary said distance at a speed correlated with the ground traversing speed of the frame to cause said discharge opening to remain in fixed position over a predetermined area of the ground, means for moving said drive wheel out of engagement with the ground wheel and returning said pipe member to its forward position, and means for re-engaging the drive wheel to maintain the discharge opening over another predetermined area.

3. A watering device comprising: a frame supported on a plurality of ground traversing wheels, a water tank carried by the frame, a pair of telescoping pipe members mounted on the frame for pivotal movement about a substantially vertical axis, one of said members having a discharge opening at its outer end, means including a first valve for connecting the other of said pipe members to the water tank, a horizontally arranged arcuate guide track on the frame, a follower secured to said one pipe member and riding in said track, a drive wheel movably mounted on the frame, a fluid-operated piston and cylinder device for moving the drive wheel into and out of engagement with one of said ground wheels, means connecting the drive wheel with said pipe members, said wheel when engaged serving to pivot the pipe members to move the discharge opening from a forward to a rearward position relative to the frame, movement of said follower along said track with pivotal movement of the pipe members serving to telescope said one pipe member relative to the other to cause said discharge opening to remain in fixed position over a predetermined area of the ground, means for returning the discharge opening to its forward position with disengagement of said drive wheel, a second valve for directing fluid under pressure into said piston and cylinder device, and a manually operable handle connected to each of said valves for operating the same simultaneously.

References Cited in the file of this patent

UNITED STATES PATENTS

| | | |
|---|---|---|
| 1,751,531 | Schars | Mar. 25, 1930 |
| 1,822,207 | Fox | Sept. 8, 1931 |
| 2,064,278 | Tappe | Dec. 15, 1936 |
| 2,363,776 | Dale | Nov. 28, 1944 |

FOREIGN PATENTS

| | | |
|---|---|---|
| 2,587 | Great Britain | July 5, 1877 |